Aug. 1, 1933. M. J. WEBER 1,920,332
SCALE
Filed Feb. 23, 1929 5 Sheets-Sheet 2

Inventor
Mathias J. Weber
By:- Cheever, Cox & Moore
Atty's.

Aug. 1, 1933.  M. J. WEBER  1,920,332
SCALE
Filed Feb. 23, 1929   5 Sheets-Sheet 4

Inventor:-
Mathias J. Weber
By Cheever, Cox & Moore
Attys.

Aug. 1, 1933.  M. J. WEBER  1,920,332
SCALE
Filed Feb. 23, 1929  5 Sheets-Sheet 5

Inventor:-
Mathias J. Weber
By:- Cheever, Cox, & Moore
Atty's.

Patented Aug. 1, 1933

1,920,332

UNITED STATES PATENT OFFICE 1,920,332

SCALE

Mathias J. Weber, Chicago, Ill., assignor to Continental Scale Works, Chicago, Ill., a Corporation of Illinois Application February 23, 1929. Serial No. 342,136

24 Claims. (Cl. 265—49.)

My invention relates to weighing scales and particularly to those types of scales which are commonly known as baby scales.

One of the problems presented in connection with the manufacture of scales which are to be used primarily for weighing infants is that of providing a scale which is not only rigid in construction and efficient in operation but which is very stable. In other words, a scale for weighing infants should be constructed and arranged so that it is not easily tipped. It is one of the primary objects of my invention to provide a durable and rigidly constructed scale of the above type having increased stability, and to insure this stability I propose to position the infant receiving tray at a minimum distance above the base of the scale.

Another object of my present invention is to provide a baby scale as above set forth in which the vertical cross head stem is of reduced length in order to enable the infant receiving tray to be positioned a short distance above the scale base, and I further propose to provide an improved substantially frictionless support at the lower extremity of said stem.

More specifically, it is an object of my invention to provide a scale having improved bearing construction and to this end I mount certain of the scale parts by means of knife edge bearings of novel construction which are self adjusting and readily accessible for purposes of repair and replacement.

A still further object of my invention is to provide a parallelogram arrangement of frictionless or knife edge bearings for the scale beam and cross head stem, whereby increased sensitivity in the movement of the scale beam is obtained and the lateral swinging or displacement of the stem positively precluded.

In addition to the above mentioned advantageous characteristics, my invention contemplates the provision of a scale of the above mentioned improved design which is provided with a beam weight of improved practical construction, said weight being adapted for detachable connection with the extremity of the beam in a very convenient manner.

These and numerous other objects will be more apparent from the following detailed description when considered in connection with the accompanying drawings, wherein—

Figure 1:
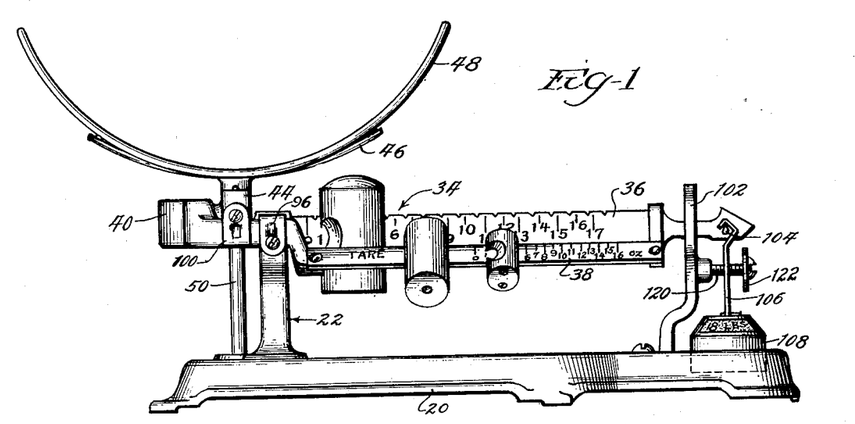
Figure 1 is a front elevational view of a scale embodying features of my invention.

Referring now to the drawings more in detail wherein like numerals have been employed to designate similar parts throughout the various figures, it will be observed that one embodiment of my invention comprises a scale including a base 20. Extending upwardly near one extremity of the base 20 to the left, Figure 1, is a frame member or support 22, the upper portions thereof terminating in a pair of spaced support arms 24, Figure 6. These arms 24 are provided with a recess 26 at their upper extremities, Figures 10 and 11, to accommodate a V-shaped bearing block 28 and a companion knife edge bearing element 30. The specific structural arrangement of these bearing elements will be more fully described as the description progresses. These knife edge bearing elements 30 are secured to and extend outwardly from a bearing section 32 which forms a part of a scale beam indicated generally by the numeral 34.

Figure 2:
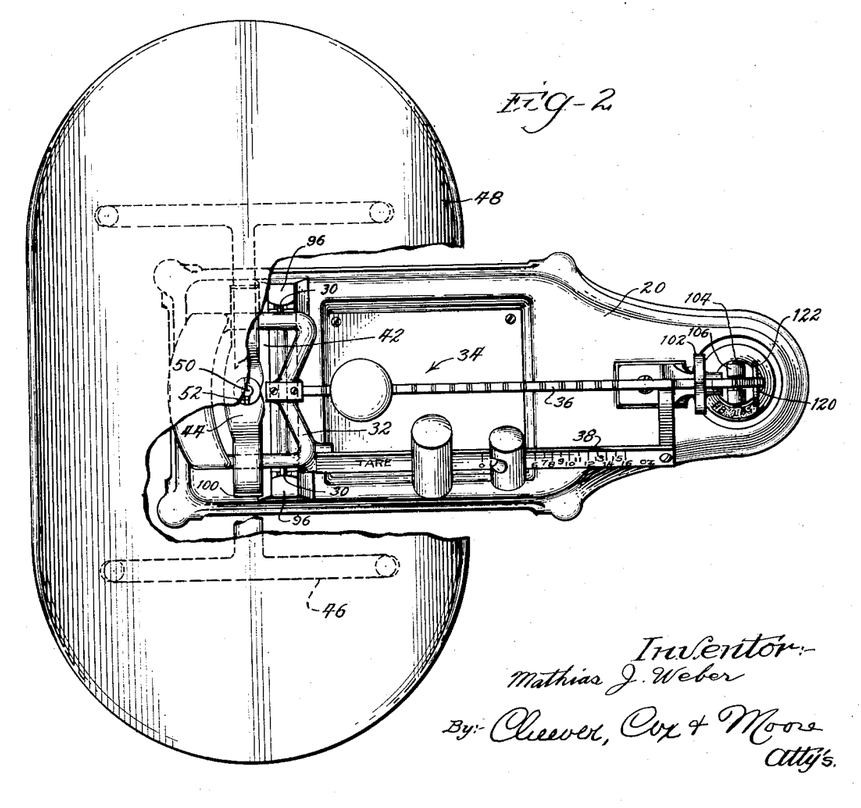
Figure 2 is a plan view thereof with a portion of the tray broken away to disclose parts otherwise hidden.
Figure 8:
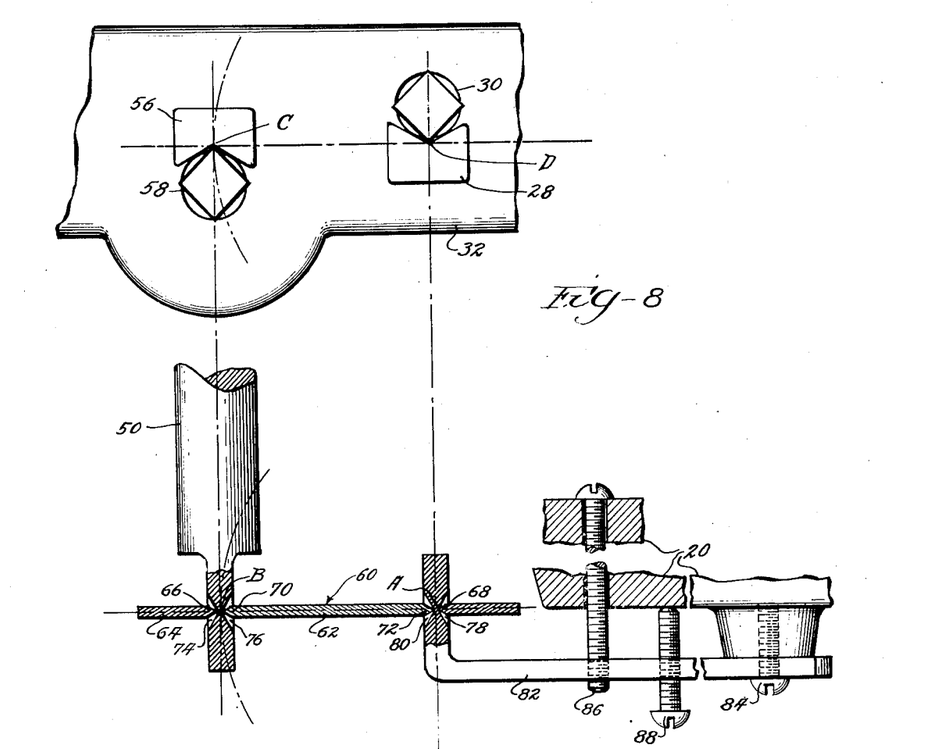
Figure 8 is a fragmentary semi-diagrammatic view disclosing the parallelogram arrangement of the knife edge bearings and specifically the knife edge means for supporting the lower end of the beam stem.
Figure 9:
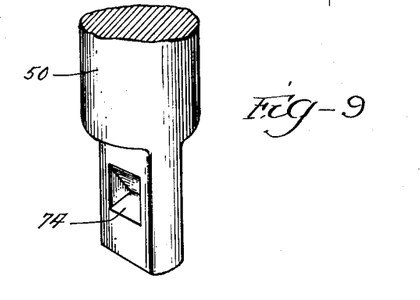
Figure 9 is an enlarged fragmentary perspective view of the lower end of the cross head or beam stem.

This beam 34 includes a pair of graduated beams 36 and 38 which are secured at one extremity in any suitable manner to the bearing section 32, the beam element 36 being secured medially of the bearing element 32 as clearly shown in Figure 2. The bearing section 32 is provided with a convenient weighted portion 40 and is formed with an opening 42, Figure 2. Traversing this opening 42 and mounted at opposite extremities upon the bearing section 32 is a cross head 44. The upper central portion of this cross head 44 provides a mounting for a frame 46 which supports an arcuate tray 48. Pressed into and extending through the central portion of the cross head member 44 is a stem 50. The upper extremity of this stem 50 extends above the cross head sufficiently to receive the tray frame 46, as clearly shown in Figure 6. In this connection it will be observed that in order to facilitate the proper positioning of the tray, I provide a pair of upwardly extending lugs 52 on the cross head 44 which co-operate with companion recesses provided in the tray frame 46. The stem 50 extends downwardly into the base 20 through an opening 54, Figures 3 and 4. Attention is directed to the fact that the stem 50 is comparatively short as distinguished from types of stems which have heretofore been employed and by reason of this shortness, the tray 48 is proportionately lowered. By lowering the position of the tray with respect to the scale base I am able to greatly increase the stability of the scale or in other words, I have been able to reduce to a minimum the tendency for the scale to tip when an infant is lying in the tray. Any tendency of the tray to be tipped to the right or left, as viewed in Figure 1, will be transmitted to the lower end of the stem 50 and hence means must be provided to secure said stem against lateral movement. The cross head 44 is pivotally supported by a knife edge bearing arrangement similar to that already described in connection with the bearing for the scale beam 34. Thus a V-shaped bearing block 56 rests upon a knife edge element 58, Figures 1 and 8, which is secured to and extends outwardly from the section 32 of the scale beam. In scales heretofore employed the distance between the pivotal support or fulcrum of the beam stems and the lower extremities thereof has been considerably greater than that disclosed in the drawings. In using a longer beam stem, the supporting means at the lower extremity of said stem is subjected to lateral forces in response to any tendency to tip the scale tray which are considerably less than the lateral forces to which a supporting means at the lower extremity of a relatively short stem is subjected. Thus the lateral forces to which the lower extremity of the stem 50 is subjected are considerably greater than the forces experienced by known types of elongated beam stems. Obviously, an increase in the lateral forces at the lower end of the stem would tend to increase the frictional resistance of the supporting means located at that point. To compensate for this increase in forces tending to swing or laterally displace the depending portion of the stem 50, I provide a frictionless or knife edge construction which is designated generally by the numeral 60, Figures 3, 4 and 8.

The knife edge construction or unit 60 includes a pair of co-operating bars 62 and 64. The bar 62 is adapted to be positioned in the same plane and in parallelism with the companion bar 64, the bar 64 being apertured to receive the bar 62. The bar 64 is provided with knife edge tips 66 and 68 while the bar 62 is provided with similar opposed knife edge tips 70 and 72, Figure 8. The lower extremity of the stem 50 is reduced and provided with opposed V-shaped recesses 74 and 76 which are adapted to receive the knife edge tips 66 and 70 respectively. The knife edge tips 68 and 72 are associated with V-shaped recesses 78 and 80 respectively which are formed within the upwardly extending portion of a rod 82. This rod 82 is secured in a fixed position within the hollow portion of the base 20 by means of a screw 84 and adjusting screws 86 and 88 are provided which are adapted to spring the rod 82 sufficiently to vertically adjust the position of the fulcrum which I have designated by the letter (A). This letter (A) designates the point or fulcrum about which the bars 62 and 64 are adapted to swing. I have designated the opposite fulcrum by the letter (B) as clearly shown in Figure 8. While there is some thickness of stock extending between the recesses 74 and 76 in the stem 50 and the recesses 78 and 80 in the rod 82, this thickness is so small that for all practical purposes it may be said that the lower end of the rod 50 is mounted upon a single knife edge fulcrum (B) and the rod 82 provides a single knife edge fulcrum (A). The knife edge fulcrum between the elements 56 and 58 is designated by the letter (C) and the fulcrum between the elements 28 and 30 by the letter (D). Thus it will be apparent that a parallelogram arrangement of knife edge bearings is presented. The fulcrum (A) is positioned in vertical alignment with the fulcrum (D) and the fulcrum (B) in vertical alignment with the fulcrum (C), the distances (B—C) and (A—D) being equal. The screws 86 and 88 provide convenient means for adjusting the distance (A—D).

From the foregoing description of the knife edge construction designated by the numeral 60 it will be understood that the lower end of the stem 50 is secured against lateral displacement and is vertically movable within a frictionless or knife edge bearing. Thus, regardless of the increase in lateral forces to which the lower end of the stem may be subjected as a result of the decrease in the length thereof, the above described knife edge fulcrums (A) and (B) preclude the possibility of any increase in frictional resistance. The bars 62 and 64 may be conveniently stamped from sheet metal or the like, the bar 62 forming the inner and the bar 64 the outer portion of such stamping. Such parts may be very conveniently removed for purposes of repair or replacement. The parallelogram arrangement just described enables the distance between the knife edges, namely, the distances (C—D) and (A—B) to be comparatively short. By shortening the distance between these knife edges the stability of the scale is greatly enhanced by reason of the fact that the tendency of tipping the scale to the left, Figure 1, is materially reduced.

Figure 10:
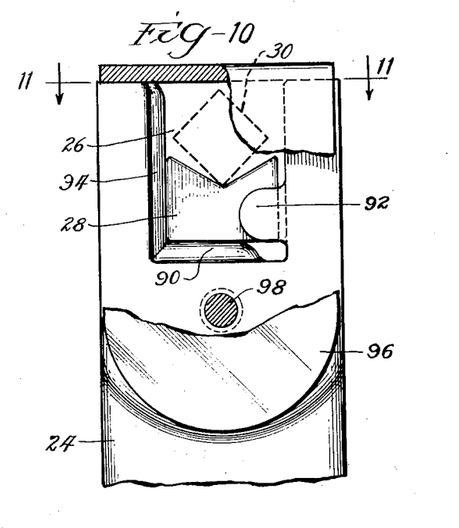
Figure 10 is an enlarged detail view of the beam knife edge bearing.
Figure 11:
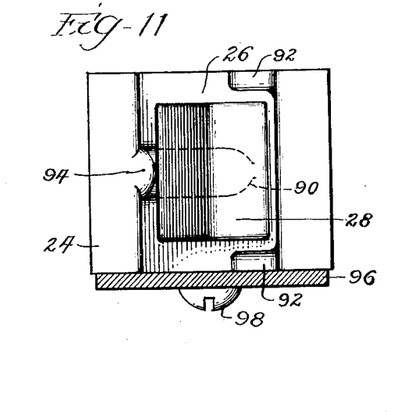
Figure 11 is a horizontal sectional view taken substantially along the line 11—11 or Figure 10.
Figures 12, 13, 14:
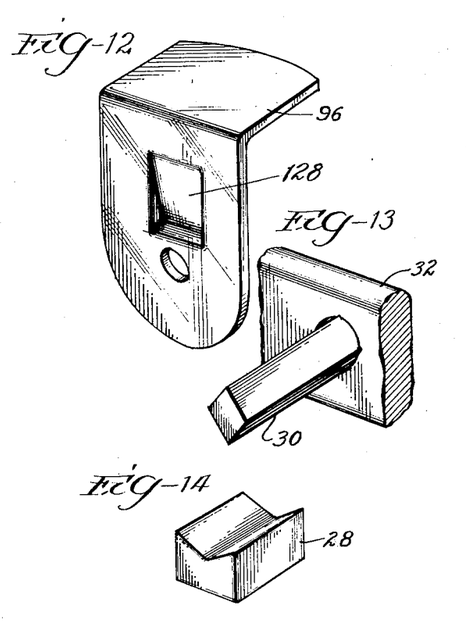
Figure 12 is a detailed perspective view of the bearing guard.
Figure 13 is a fragmentary perspective view of the knife edge bearing element carried by the scale beam.
Figure 14 is a detailed perspective view of the bearing element which supports the knife edge element shown in Figure 13.
Figure 15:
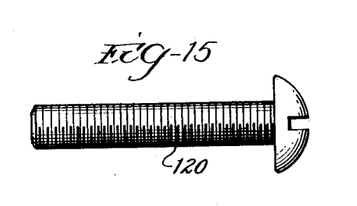
Figures 15 and 16 disclose the screw and washer elements for supporting the beam weight.
Figure 16:
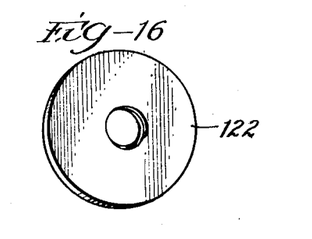

Attention is now directed to the specific manner in which I have arranged the knife edge bearings associated with the scale beam 34. All of the bearings associated with the scale beam are identical in construction and therefore a description of one will suffice for all. Referring then to Figures 10 and 14 inclusive, it will be seen that the bearing element 28 rests within the bottom of the recess 26 formed in the frame arm 24. Traversing the medial portion of the bottom of the recess 26 is an elongated protuberance 90 which is provided with a cylindrical bearing surface for supporting the bearing element 28. Lugs 92 formed integral with the frame arm 24 provide guards to prevent lateral displacement of the element 28 within the recess 26. Extending upwardly along one side of the recess 26 and forming a continuation of the protuberance 90 is a vertical protuberance 94. This protuberance 94 forms the lateral support for one side of the bearing element 28. From the foregoing it will be apparent that the protuberances 90 and 94 permit the bearing element 28 to be freely tiltable within predetermined limits about a vertical and a horizontal axis within the recess 26 so as to permit of the self adjustment of said bearing element. In other words, the element 28 is self aligning. To prevent the inadvertent outward displacement of the bearing elements 28 and 30 I provide an L-shaped guard member 96 which is adapted to be secured to the arm 24 by means of a screw 98. The knife edge bearing elements 56 and 58 are mounted within the extremities of the cross head 54 in a manner similar to that described in connection with the mounting of the elements 28 and 30 in the frame arm 24, the only difference being that the position of the knife edge elements is reversed, that is to say, the element 58 which corresponds with the element 30 is positioned beneath the block or element 58. The bearing elements 56 and 58 are also secured in position by means of a guard member 100 which is similar to the guard member 96 already described.

Figure 4:
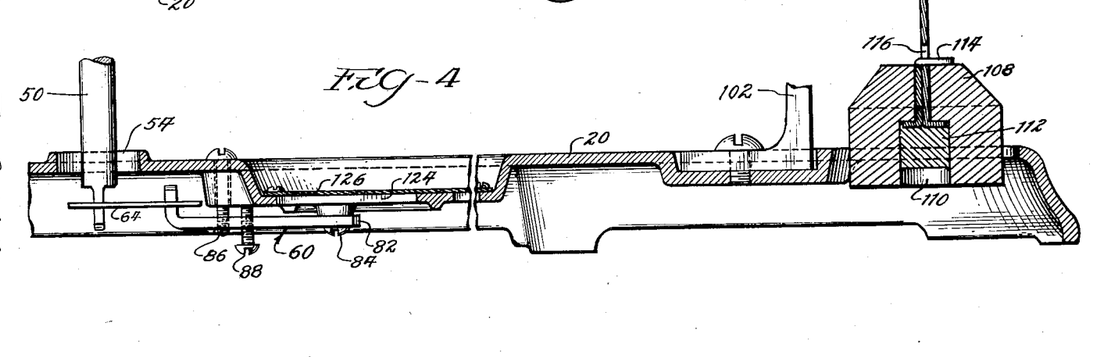
Figure 4 is a sectional view taken substantially along the line 4—4 of Figure 3.
Figure 5:
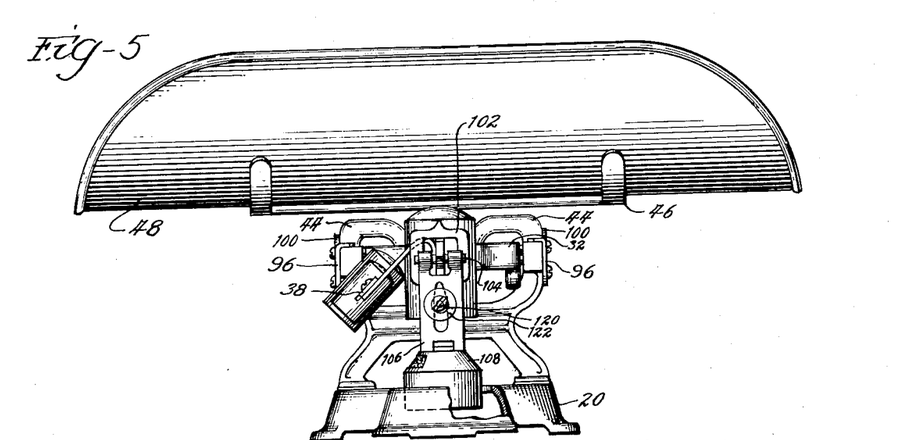
Figure 5 is an end elevational view as viewed from the right of Figure 1.
Figures 6, 7:
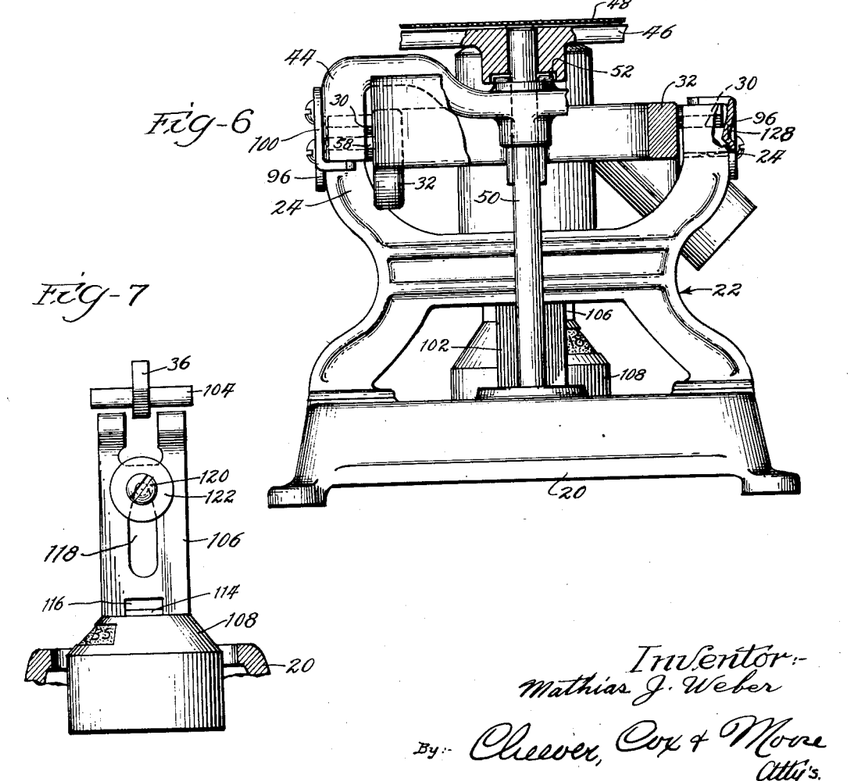
Figure 6 is an enlarged fragmentary end view of the scale as viewed from the left of Figure 1, portions of the cross head and tray support being broken away for the purpose of more clearly disclosing certain structural characteristics.
Figure 7 is an enlarged elevational view of the end beam weight as shown in Figure 5, the same being detached from the scale beam.

The free end of the graduated scale beam 36 operates within the upper portion of a vertically disposed frame 102. The outer extremity of the beam 36 is provided with a knife edge member 104 which is adapted to receive a pair of fingers provided at the upper extremity of a stem 106. The lower end of this stem 106 extends into a suitable weight 108, Figures 4 and 7. A recess 110 provided within the weight 108, Figure 4, is adapted to receive a supply of lead or other suitable filling material 112. It will be noted that the lower end of the stem 106 is bent so as to prevent the outward displacement thereof and an S-shaped locking member 114 serves as an additional means for securing the weight 108 to the stem. A recess 116 is formed in the stem adjacent the upper end of the weight 108 so as to permit the upper tip of the locking member 114 to be inserted therethrough. This construction enables the weight and its associated stem to be assembled in a very convenient and practical manner and enables the molten filling material or lead 112 to be conveniently poured into the weight recess 110 after the stem and locking member are in position. The stem 106 is also provided with an elongated slot 118, Figure 7. A screw 120 projects laterally from the frame 102, extends through the slot 118 and provides a means for supporting the weight 108 when the stem 106 is detached from the knife edge member 104. When the stem 106 is supported by the screw 120, Figure 7, the lower surface of the weight is positioned above the plane of the bottom of the base 20. To further insure the proper positioning of the stem 106 I provide a washer 122 at the outer end of the screw 120. This washer is threaded to receive said screw and in order to secure the washer in a fixed position against the screw head I apply an additional threading force to the washer as it is carried into engagement with the screw head. The screw threads being stronger than the washer threads cause said washer threads to be mutilated sufficiently to freeze the same in position adjacent the screw head. The upper extremity of the slot 118 is tapered so that when the fingers of the stem are disengaged from the knife edge member 104, and the weight is permitted to be dropped down, said weight will automatically seek a central position. Freely suspended in this position, said weight will be protectively housed within the walls of the base 20 as shown in Figure 7. This construction provides a convenient means for storing the weight, when not in use, in a position from which said weight may be conveniently moved into operative relation with respect to the scale beam. The attachment of the weight to the frame or support 102 is such that it cannot be inadvertently removed. In conventional types of scales having weights which may be readily removed, the weights are frequently lost or misplaced. This inconvenience is positively avoided by the use of my improved construction. It is also to be noted that the weight stem 106 passes through an opening in the weight 108 which is substantially twice the thickness of the stem 106. The space which remains after the stem has been inserted, is taken up by the locking member 114. In this manner the opening within the weight is large enough so as to permit the same to be formed within the weight at the time of molding. In other words, if the stem 106 alone were passed through the weight, the opening would be so small that it would be impractical to form the same during the molding operation. Thus my improved weight and stem construction presents a very practical arrangement from the standpoint of manufacture. In addition to taking up the increased width of the opening in the weight 108 the member 114 provides a very positive lock.

At this point attention is directed to the novel manner in which I provide for the end thrust of the knife edge bearing members 30 and 58. Referring to Figure 6 it will be observed that the lowermost outer corner of the element 30 is adapted to engage the inner surface of a struck-out portion 128 provided in the vertical section of the guard member 96. All of the guard members are provided with these struck-out portions and thus the knife edge bearing elements 38 and 58 are adapted to make a point contact with the struck-out portions. In this manner the frictional resistance occasioned by the end thrust of the bearing elements is reduced to a minimum. These bearing elements 30 and 58 may comprise sections of hardened square stock which are conveniently secured in position upon the beam section 32.

Figure 3:
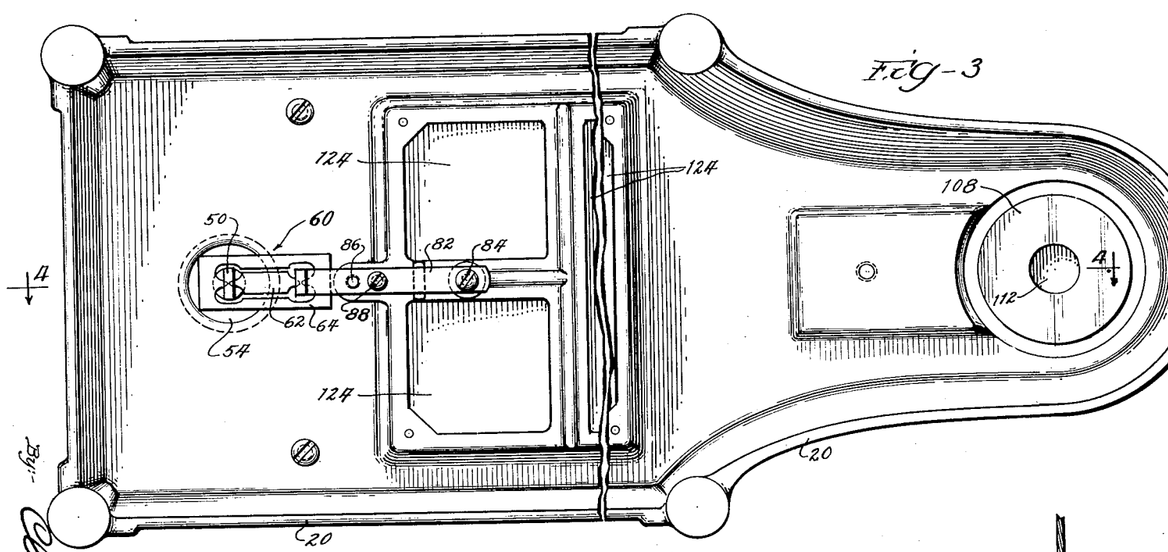
Figure 3 is an enlarged bottom view of the scale.

The base 20 is provided with recesses 124, Figures 3 and 4, so as to reduce the weight of said base. Superimposing each of these recesses 124 is a relatively thin cover plate or tray 126 which is positioned below the upper plane of the base. This tray 126 provides a convenient storage space and in some instances might be used for accommodating tables, charts and the like.

From the foregoing it is to be understood that my invention contemplates the provision of a scale which represents a decided advance in the art over baby scales and the like which have heretofore been employed. By shortening the cross head stem I am able to materially lower the position of the infant receiving tray and hence correspondingly increase the stability of the scale without adding to the bulk thereof. The increase in lateral forces experienced by the lower end of the stem as the result of the decrease in length thereof is more than compensated by the novel knife edge arrangement for supporting the lower end of the stem. The parallelogram arrangement of the knife edges as above described presents a very practical and novel arrangement which makes for simplicity of construction, durability and increased stability. The size and general arrangement of the scale is such as to permit the same to be conveniently moved from place to place with little effort. The arrangement of the weight at the free extremity of the scale beam presents a decided improvement over said supports which have heretofore been employed. When the weight is not in use, the same may be freely suspended in a convenient position. All of the scale parts have been constructed and arranged with the view of presenting a device which is of very practical construction, pleasing in appearance and conveniently manipulated.

Having thus described my invention, what I claim as new and desire to secure by Letters Patent is:

1. In a scale of the class described, a frame, a fulcrumed scale beam on said frame, actuating means for imparting movement to the beam in response to weight placed upon the scale, said actuating means having a fulcrum connection with said beam, and means spaced from said latter fulcrum for supporting the actuating means against lateral displacement, said lateral supporting means including a pair of bars, one of said bars being positioned within the same plane as the other bar, said bars being provided with co-operating knife edges for engaging the beam actuating means, whereby frictional resistance in laterally supporting said actuating means is materially reduced.

2. In a weighing scale, a frame, a scale beam mounted thereon, and a bearing associated with said scale beam including a knife edge element, a bearing block for receiving the knife edge of said element and a support for said bearing block, protuberances extending medially of the bearing block so as to permit the same to be tiltable about a vertical and a horizontal axis so as to render the same self adjustable.

3. In a weighing scale, a frame, a fulcrumed scale beam on said frame, a detachable weight at the free extremity of the scale beam, a stem for supporting said weight, said stem being provided with a recess, and means adapted to be received by said recess for suspending said weight in detached position adjacent the free extremity of said scale beam.

4. In a weighing scale, a base, a frame extending upwardly from said base, a fulcrumed scale beam on said frame, a weight, a stem to detachably engage said weight with the free end of said scale beam, and a member for suspending the weight in detached position adjacent the free extremity of said scale beam, said member adapted to project through an elongated opening provided in the weight stem, the scale base being provided with an opening to receive and render the weight protectively housed within the base.

5. In a weighing scale, a frame, a scale beam mounted on said frame, a bearing associated with said scale beam, said bearing including a knife edge element, the outer extremity of said knife edge element being at substantially right angles with respect to the knife edge of said element, and means abutting an end edge of said element whereby to minimize the frictional resistance occasioned in response to the end thrust of said knife edge element.

6. In a weighing scale, a frame, a fulcrumed scale beam on said frame, a weight unit at the free extremity of said scale beam, said weight unit comprising a stem and a weight proper having an opening for receiving said stem which is wider than the stem, and a locking element within the remaining portion of said opening for securing said stem against outward displacement from the weight proper.

7. In a scale of the class described, a frame, a fulcrumed scale beam on said frame, actuating means for imparting movement to the beam in response to the application of a weight to be measured, said actuating means having a fulcrum connection with said beam and means spaced from said fulcrum connection for supporting the actuating means against lateral displacement, one of said fulcrums including a knife edge element, a bearing block for receiving the knife edge of said element and a support for said bearing block having medially extending protuberances therein to permit the same to be tilted about a vertical and a horizontal axis to render the same self-adjusting.

8. In a scale of the class described, a frame, a fulcrumed scale beam on said frame, actuating means for imparting movement to the beam in response to the application of a weight to be measured, said actuating means having a fulcrum connection with said beam and means spaced from said fulcrum connection for supporting the actuating means against lateral displacement, one of said fulcrums comprising a knife edge element, a bearing block for the knife edge element and a support for the bearing block comprising angularly disposed ridges upon both of which the bearing block is tiltably mounted and tilting movement about angularly disposed axes.

9. In a weighing scale, a frame, a scale beam mounted thereon, and a bearing associated with said scale beam including a knife edge element, a bearing block for receiving the knife edge of said element and a support for said bearing block, protuberances extending medially of the bearing block so as to permit the same to be tiltable about a vertical and a horizontal axis so as to render the same self adjustable and means to limit the lateral movement of the block in a direction normal with said axes.

10. In a scale of the class described, a frame, a fulcrumed scale beam having a knife edge fulcrum on said frame, a bearing block for receiving the knife edge fulcrum and a tiltable support for said block carried in said frame to support the block tiltably about a transverse axis to render the same self-adjusting with respect to the knife edge fulcrum in order to frictionlessly support the scale beam in the frame, actuating means for imparting movement to the beam in response to weight placed upon the scale, said actuating means having a knife edge fulcrum connection with said beam, and means spaced from said latter fulcrum for supporting the actuating means against lateral displacement, said lateral supporting means including a member adapted to make substantially a line contact with said actuating means, whereby frictional resistance in laterally supporting said actuating means is materially reduced, a detachable weight at the free extremity of the scale beam, a stem for supporting said weight, said stem being provided with a recess, and means adapted to be received by said recess for suspending said weight in detached position adjacent the free extremity of said scale beam.

11. A scale comprising a frame, a scale beam, a cross-head for said scale beam, a scale platform or tray operatively supported by the cross-head, a stem for said platform or tray and extending below the cross-head, a knife edge carried by the scale beam, an inverted V-shaped block carried by said cross head and making a fulcrum with the knife edge, a V-shaped block carried by said frame, a knife edge engaging the last named V-block and making a fulcrum for the scale beam, and lateral support means for the stem, said lateral supporting means including a pair of bars, one of said bars being positioned within the same plane as the other bar, said bars being provided with co-operating knife edges for engaging the beam actuating means, whereby frictional resistance in laterally supporting said actuating means is materially reduced.

12. A scale comprising a frame, a scale beam, a cross-head for said scale beam, a scale platform or tray operatively supported by the cross-head, a stem for said platform or tray and extending below the cross-head, a knife edge carried by the scale beam, an inverted V-shaped block carried by said cross-head and making a fulcrum with the knife edge, a V-shaped block carried by said frame, a knife edge engaging the last named V-block and making a fulcrum for the scale beam, means to support at least one of said V-shaped blocks for tilting movement about a plurality of angularly extending axes whereby to render the same self-aligning, a knife edge fulcrum for the stem for preventing lateral displacement thereof, and means for regulating the last named fulcrum.

13. A scale comprising a frame, a scale beam, a cross-head for said scale beam, a scale platform or tray operatively supported by the cross-head, a stem for said platform or tray and extending below the cross-head, a knife edge carried by the scale beam, an inverted V-shaped block carried by said cross head and making a fulcrum with the knife edge, a V-shaped block carried by said frame, a knife edge engaging the last named V-block and making a fulcrum for the scale beam, means to support at least one of said V-shaped blocks for tilting movement about a plurality of angularly extending axes whereby to render the same self-aligning, means to limit the lateral displacement of the block with respect to said axes, a knife edge fulcrum for the stem for preventing lateral displacement thereof, a rigidly mounted member, and means for adjusting the rigidly mounted member to affect adjustment of the last named knife edge fulcrum.

14. A scale comprising a frame, a scale beam, a cross head for said scale beam, a scale platform or tray operatively supported by the cross-head, a stem for said platform or tray and extending below the cross-head, a knife edge carried by the scale beam, an inverted V-shaped block carried by said cross-head and making a fulcrum with the knife edge, a V-shaped block carried by said frame, a knife edge engaging the last named V-block and making a fulcrum for the scale beam, means to support at least one of said V-shaped blocks for tilting movement about a plurality of angularly extending axes whereby to render the same self-aligning, means to limit the lateral displacement of the block with respect to said axes, and lateral support means for the stem, said lateral supporting means including a pair of bars, one of said bars being positioned within the same plane as the other bar, said bars being provided with co-operating knife edges for engaging the beam actuating means, whereby frictional resistance in laterally supporting said actuating means is materially reduced.

15. A scale comprising a scale beam, a cross-head for said scale beam, a scale platform operatively supported by the cross-head, a stem for said platform extending below the cross-head, a fulcrum for the cross-head, a fulcrum for the scale beam in line with the cross-head fulcrum, said scale beam and cross-head fulcrum including knife edge elements adapted to receive a knife edge carried by the scale beam and means for tiltingly mounting said elements for pivotal movement about a plurality of angularly disposed axes whereby to render the same self-adjusted with respect to the knife edge, a rigidly mounted member, a link fulcrumed laterally with the rigidly mounted member below the cross-head fulcrum and in line therewith, a fulcrum connection between the link and stem directly below the cross-head fulcrum and opposite the last named fulcrum whereby said four fulcrums comprise a true parallelogram arrangement.

16. In a scale of the class described, a frame, a scale beam fulcrumed on said frame, an actuating member tiltably mounted on the beam, a support for the actuating member to maintain it at all times in parallelism with itself, comprising a support member mounted on the frame and a tilting connector extending between the actuating member and the support member, said tilting connector comprising a spacing member extending between the support member and the actuating member and having a portion entering a depression on one side of the actuating member and a yoke for the support member and the actuating member and having a projection entering a depression directly opposite the depression of the actuating member from that in which the spacing member seats.

17. In a scale of the class described, a frame, a scale beam fulcrumed on said frame, an actuating member tiltably mounted on the beam, a support for the actuating member to maintain it at all times in parallelism with itself, comprising a support member mounted on the frame and a tilting connector extending between the actuating member and the support member, said tilting connector comprising a spacing member extending between the support member and the actuating member and having a portion entering a depression on one side of the actuating member and a yoke for the support member and the actuating member and having a projection entering a depression directly opposite the depression of the actuating member from that in which the spacing member seats, and means to adjustably shift the support member on the frame.

18. In a scale of the class described, a frame, a scale beam fulcrumed on said frame, and a balance weight detachably connected to said scale beam, said balance weight including a shank having an elongated opening and means on the shank to removably mount the weight on the scale beam and support means carried by the frame and extending through the elongated opening on the shank whereby when the weight is detached from the scale beam, the same may be supported by the frame.

19. In a scale of the class described, a frame, a scale beam fulcrumed on said frame, and a balance weight detachably connected to said scale beam, said balance weight including a shank having an elongated opening and means on the shank to removably mount the weight on the scale beam and support means carried by the frame and extending through the elongated opening on the shank whereby when the weight is detached from the scale beam, the same may be supported by the frame, said frame being formed with a socket to receive a portion of the balance weight at all times whether operatively connected to the scale beam or when supported by the support means on the frame.

20. In a scale of the class described, a frame, a scale beam fulcrumed on said frame, a measuring weight slidably carried with respect to said scale beam, a balance weight detachably connected to said scale beam, said balance weight including a shank having an elongated opening and means on the shank to removably mount the weight on the scale beam and support means carried by the frame and extending through the elongated opening on the shank whereby when the weight is detached from the scale beam, the same may be supported by the frame in position to permit the weight to be readily reattached to the scale beam.

21. In a scale of the class described, a frame, a scale beam fulcrumed on said frame, a balance weight connecting means to removably connect the weight on the scale beam and cooperating means formed and arranged on said weight connecting means and on said frame whereby to support the weight on the frame when the same is disconnected from the scale beam.

22. In a scale of the class described, a frame, a scale beam fulcrumed on said frame, a balance weight removably connectible to the scale beam and cooperating means formed and arranged on said weight and on said frame whereby to support the weight on the frame when the same is disconnected from the scale beam, said weight having a vertically elongated opening therethrough and a stud extending through said opening and taking into the frame.

23. In a scale of the class described, a frame, a scale beam fulcrumed on said frame, a balance weight removably connectible to the scale beam and cooperating means formed and arranged on said weight and on said frame whereby to support the weight on the frame when the same is disconnected from the scale beam, said weight having a vertically elongated opening therethrough and a stud extending through said opening and taking into the frame, and a washer threaded on the stud to prevent the head thereof from passing through the elongated opening of the weight.

24. In a scale of the class described, a frame, a scale beam fulcrumed on said frame, a balance weight removably connectible to the scale beam and cooperating means formed and arranged on said weight and on said frame whereby to support the weight on the frame when the same is disconnected from the scale beam, additional means formed in the frame to receive the weight at a point remote from the opening therein.

MATHIAS J. WEBER.